United States Patent
Rithauddeen et al.

(10) Patent No.: US 11,000,779 B2
(45) Date of Patent: May 11, 2021

(54) REMOVAL OF KINETIC HYDRATE INHIBITORS

(71) Applicant: Saudi Arabian Oil Company, Dhahran (SA)

(72) Inventors: Megat A. Rithauddeen, Dhahran (SA); Shadi I. Al-Adel, Dhahran (SA); Ahmad Fadzil Mohammad, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 196 days.

(21) Appl. No.: 16/223,448

(22) Filed: Dec. 18, 2018

(65) Prior Publication Data

US 2019/0118114 A1    Apr. 25, 2019

Related U.S. Application Data

(62) Division of application No. 15/270,710, filed on Sep. 20, 2016.

(Continued)

(51) Int. Cl.
*B01D 11/04* (2006.01)
*B01D 17/02* (2006.01)
(Continued)

(52) U.S. Cl.
CPC .......... *B01D 11/0457* (2013.01); *B01D 17/02* (2013.01); *B01D 17/0214* (2013.01);
(Continued)

(58) Field of Classification Search
CPC .. C02F 1/02; C02F 1/26; C02F 1/5281; C02F 2101/32; C02F 2101/30; C02F 2103/365;
(Continued)

(56) References Cited

U.S. PATENT DOCUMENTS 3,637,522 A * 1/1972 Young ............... B01D 17/047
516/141
7,033,504 B1    4/2006 Blytas et al.
(Continued)

FOREIGN PATENT DOCUMENTS

EP         2734277         5/2014
WO    2013/121217 A2     8/2013
(Continued)

OTHER PUBLICATIONS

Al-Shaabi, M., et al., "Produced water management for sustainable reinjection—bench scale tests to remove and destroy KHI", International Petroleum Technology Conference, Doha, Qatar, Jan. 20-22 (Year: 2014).*

(Continued)

*Primary Examiner* — Benjamin L Lebron
(74) *Attorney, Agent, or Firm* — Fish & Richardson P.C.

(57) ABSTRACT

A method includes receiving a water stream from a hydrocarbon production facility, the water stream having a first concentration of a kinetic hydrate inhibitor (KHI); flowing the water stream through a heat exchanger to heat the water stream to a target temperature; mixing the heated water stream with a treatment chemical to form a two-phase mixture, the treatment chemical having an affinity for the KHI; flowing the two-phase mixture into a separator; and physically separating the two-phase mixture into a first phase and a second phase, the first phase including water and having a second concentration of the KHI less than the first concentration, and the second phase including the KHI and the treatment chemical, the density of the second phase being less than the density of the first phase.

20 Claims, 4 Drawing Sheets

Related U.S. Application Data

(60) Provisional application No. 62/222,547, filed on Sep. 23, 2015.

(51) Int. Cl.
*B01D 17/04* (2006.01)
*C02F 1/02* (2006.01)
*C02F 1/26* (2006.01)
*C02F 1/52* (2006.01)
*C10G 75/04* (2006.01)
*C02F 101/30* (2006.01)
*C02F 103/36* (2006.01)
*C02F 101/32* (2006.01)

(52) U.S. Cl.
CPC .............. *B01D 17/042* (2013.01); *C02F 1/02* (2013.01); *C02F 1/26* (2013.01); *C02F 1/5281* (2013.01); *C10G 75/04* (2013.01); *C02F 2101/30* (2013.01); *C02F 2101/32* (2013.01); *C02F 2103/365* (2013.01); *C02F 2303/18* (2013.01)

(58) Field of Classification Search
CPC . C02F 2303/18; B01D 17/02; B01D 17/0214; B01D 17/0208; B01D 17/0217; B01D 17/042; B01D 17/045; B01D 11/04; B01D 11/0457; C10G 75/04
See application file for complete search history.

(56) References Cited

U.S. PATENT DOCUMENTS

| | | |
|---|---|---|
| 7,994,374 B2 | 8/2011 | Talley et al. |
| 2005/0072663 A1 | 4/2005 | Laborie |
| 2012/0046248 A1* | 2/2012 | Jones ........................ C02F 1/50 514/126 |
| 2012/0247972 A1 | 10/2012 | Spencer et al. |
| 2013/0121217 A1 | 5/2013 | Khlat |
| 2013/0292122 A1 | 11/2013 | Nichols et al. |
| 2014/0054042 A1 | 2/2014 | Pich et al. |
| 2014/0256599 A1* | 9/2014 | Kelland ................ C07C 277/08 507/90 |
| 2014/0346033 A1 | 11/2014 | Kaasa et al. |

FOREIGN PATENT DOCUMENTS

| | | | |
|---|---|---|---|
| WO | 2015/022480 A1 | 2/2015 | |
| WO | WO-2015022480 A1 * | 2/2015 | ............ E21B 43/34 |

OTHER PUBLICATIONS

Gulf Cooperation Council Examination Report issued in GCC Application No. GC2016-32071 dated May 8, 2019, 4 pages.
European Communication Pursuant to Article 94(3) EPC, issued in European Application No. 16771079.7 dated Feb. 11, 2020, 4 pages.
Gulf Cooperation Council Examination Report issued in GCC Application No. GC2016-32071 dated Nov. 19, 2018, 3 pages.
Gulf Cooperation Council Examination Report issued in GCC Application No. GC2016-32071 dated Oct. 14, 2019, 3 pages.
GCC Examination Report in GCC Appln. No. GC 2016-39172, dated May 29, 2020, 4 pages.
International Search Report and Written Opinion of the International Searching Authority issued in International Application No. PCT/US2016/052609 dated Nov. 7, 2016; 11 pages.
European Communication Pursuant to Article 94(3) EPC, issued in European Application No. 16771079.7 dated Dec. 12, 2019, 5 pages.

* cited by examiner

REMOVAL OF KINETIC HYDRATE INHIBITORS

CLAIM OF PRIORITY

This application is a Divisional of and claims the benefit of priority to U.S. patent application Ser. No. 15/270,710, filed on Sep. 20, 2016, which claims priority to U.S. Provisional Patent Application Ser. No. 62/222,547, filed on Sep. 23, 2015, the entire contents of which are hereby incorporated by reference.

BACKGROUND

Hydrates are crystalline solids that form in the presence of water and certain types of light hydrocarbon molecules. Hydrate formation can occur in fluid streams containing hydrocarbons and water, such as fluid streams from hydrocarbon production wells or processing plants. Hydrates can accumulate on inner walls of pipes or fluid receptacles, blocking the flow of the fluid stream there through and fouling equipment. To inhibit hydrate formation, hydrate inhibitors, such as kinetic hydrate inhibitors (KHIs), can be added to the fluid stream. KHIs are substances, such as water soluble polymers, that inhibit the formation of hydrates, for example, by slowing the nucleation or growth of hydrate crystals. Treating a fluid stream with KHI thus enables fluid streams to pass along a flow path with reduced hydrate formation.

SUMMARY

In a general aspect, a method includes receiving a water stream from a hydrocarbon production facility, the water stream having a first concentration of a kinetic hydrate inhibitor (KHI); flowing the water stream through a heat exchanger to heat the water stream to a target temperature; mixing the heated water stream with a treatment chemical to form a two-phase mixture, the treatment chemical having an affinity for the KHI; flowing the two-phase mixture into a separator; and physically separating the two-phase mixture into a first phase and a second phase, the first phase including water and having a second concentration of the KHI less than the first concentration, and the second phase including the KHI and the treatment chemical, the density of the second phase being less than the density of the first phase.

Embodiments can include one or more of the following features.

Receiving the water stream includes receiving a fluid stream from the hydrocarbon production facility; and separating the fluid stream into a hydrocarbon stream and the water stream.

The method includes separating the fluid stream into the hydrocarbon stream, the water stream, and a gas stream.

The target temperature is based on a characteristic of the KHI, a characteristic of the treatment chemical, or both.

The received water stream is at a first temperature, and wherein the target temperature is at least 5° F. greater than the first temperature.

The target temperature is between about 70° F. and about 160° F.

Flowing the water stream through a heat exchanger includes heating the water stream to a temperature sufficient to cause at least some of the KHI to precipitate from the water stream.

Mixing the heated water stream with a treatment chemical includes adding the treatment chemical to the water stream such that a ratio of the treatment chemical to the KHI is between about 1 and about 3.

Physically separating the two-phase mixture includes performing a gravity separation.

The method includes processing the first phase to remove residual KHI.

Processing the first phase includes generating a third phase having a third concentration of KHI, the third concentration being less than the second concentration.

The method includes processing the first phase in a polisher.

The method includes removing the KHI from the second phase.

The method includes returning the separated KHI to an upstream destination in the hydrocarbon production facility for reuse.

The method includes returning the second phase to an upstream destination in the hydrocarbon processing or production facility for reuse.

The treatment chemical is substantially immiscible with water.

The treatment chemical includes a non-polar substance.

The treatment chemical includes a functional group that has an affinity for a component of the KHI.

The second concentration is at least about 40% less than the first concentration, at least about 50% less than the first concentration, or at least about 60% less than the first concentration.

A cloud point temperature of the water phase is at least about 40° C.

A fouling temperature of the water phase is at least about 90° C.

Mixing the heated water stream with a treatment chemical includes mixing the heated water stream, the treatment chemical, and an organic acid.

Mixing the heated water stream with a treatment chemical includes mixing the heated water stream, the treatment chemical, and a saline solution.

In a general aspect, a system includes a fluid inlet configured to receive a water stream from a hydrocarbon production facility, the water stream having a first concentration of a kinetic hydrate inhibitor (KHI); a heat exchanger configured to heat the water stream to a target temperature; a mixer configured to receive the heated water stream and a treatment chemical, the treatment chemical having an affinity for the KHI, wherein the water stream and the treatment chemical are mixed in the mixer to form a two-phase mixture; and a separator configured to physically separate the two-phase mixture into a first phase and a second phase, the first phase including water and having a second concentration of the KHI less than the first concentration, and the second phase including the KHI and the treatment chemical, the density of the second phase being less than the density of the first phase.

Embodiments can include one or more of the following features.

The system includes a separator configured to separate a fluid stream received from the hydrocarbon production facility into a hydrocarbon stream and the water stream.

The separator is configured to separate the fluid stream into the hydrocarbon stream, the water stream, and a gas stream.

The target temperature is based on a characteristic of the KHI, a characteristic of the treatment chemical, or both.

The received water stream is at a first temperature, and wherein the heat exchanger is configured to heat the water stream to a temperature at least 5° F. greater than the first temperature.

The target temperature is between about 70° F. and about 160° F.

The heat exchanger is configured to heat the water stream to a temperature sufficient to cause at least some of the KHI to precipitate from the water stream.

The treatment chemical is substantially immiscible with water.

The mixer includes a static mixer.

The separator includes a gravity separator.

The system includes a polisher configured to remove residual KHI from the first phase.

The polisher is configured to generate a third phase having a third concentration of KHI, the third concentration being less than the second concentration.

The system includes a pump to provide the second phase to an upstream destination in the hydrocarbon production facility for reuse.

The system includes a KHI separation component configured to remove KHI from the second phase.

The system includes a pump to provide the removed KHI from the separation component to an upstream destination in the hydrocarbon production facility for reuse.

The approaches described here can have one or more of the following advantages. Kinetic hydrate inhibitors (KHIs) can be removed from a water stream, thus reducing sludge formation and deposition in processing or disposal systems that handle the water stream. KHI removed from the water stream can be regenerated and reused, thus reducing costs and reducing the environmental impact of hydrate removal.

Other features and advantages are apparent from the following description and from the claims.

DETAILED DESCRIPTION

Kinetic hydrate inhibitors (KHIs) can be added to a fluid stream, such as a fluid stream from a hydrocarbon production well or processing plant, in order to inhibit formation of hydrates in the fluid stream. KHIs are substances that are soluble in water and that are capable of slowing the rate of hydrate nucleation. After the fluid stream is processed, KHIs remain dissolved in the produced water. In some situations, KHIs can degrade or precipitate out of solution. For instance, KHI degradation or precipitation can occur upon exposure to high temperatures or a high salinity environment, for example, during processing of the produced water or during mixing of the produced water with water from another source. KHI degradation or precipitation can lead to sludge formation which fouls the water phase and results in sludge deposition, for example, in water pipes or water processing facilities.

We describe here an approach to removing KHIs dissolved in an aqueous phase, such as a sour water stream, thus reducing the degree of sludge formation in downstream water processing facilities. In the approach described here, a treatment chemical that is immiscible with water and that has a high affinity to one or more KHI components (for example, polymers) is mixed with an aqueous phase containing KHI. The treatment chemical, which forms a separate phase from the aqueous phase, extracts one or more KHI components from the aqueous phase into the treatment chemical phase. The two-phase liquid is then separated into an aqueous phase, which has a lower concentration of KHI than the original aqueous phase, and a treatment chemical phase containing KHI. The aqueous phase with reduced KHI concentration can be further processed with a lowered risk of fouling and sludge deposition. The treatment chemical phase containing KHI can be disposed of or can be further processed, for example, for regeneration or reuse.

Figure 1:
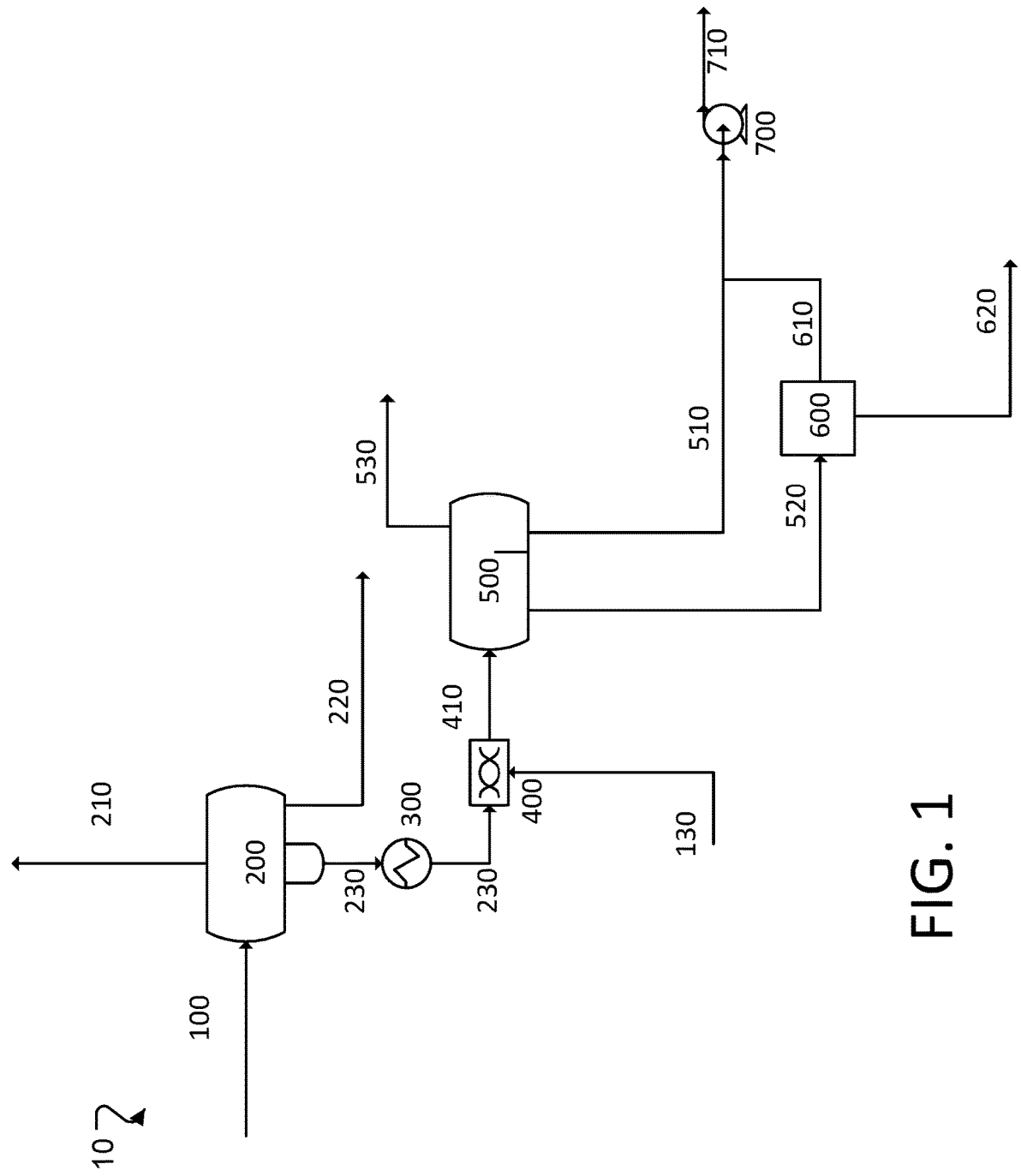
FIGS. 1-3 are a block diagrams of systems for kinetic hydrate inhibitor removal.

Referring to FIG. 1, an example system 10 removes KHI from a fluid stream 100. A KHI formulation can be composed of one or more types of polymers, such as water soluble polymers. For example, KHI polymers can include polymers or copolymers of acrylamides, maleimides, vinylpyrrolidone, vinylcaprolactam, or other types of polymers or copolymers. In some cases, KHI polymers are dissolved in a low molecular weight solvent, such as an alcohol, a glycol (for example, monoethylene glycol (MEG)), or a glycol either (for example, ethylene glycol monobutyl ether (EGBE)), or another solvent, prior to being added to the fluid stream.

Fluid stream 100 can be a stream of hydrocarbons and water, for example, from a hydrocarbon production well to which KHI was added to inhibit hydrate formation. For instance, fluid stream 100 can include about 1% KHI, about 2% KHI, about 3% KHI, or about 3.5% KHI by mass.

A separator 200 treats fluid stream 100 at conditions sufficient to separate fluid stream 100 into three phases: a gas phase 210, a hydrocarbon phase 220, and an aqueous phase 230. The separator 200 can operate at a pressure of between about 700 psig and about 1500 psig, such as about 700 psig, about 800 psig, about 900 psig, about 1000 psig, about 1100 psig, about 1200 psi, about 1300 psi, about 1400 psig, or about 1500 psig. The separator 200 can operate at a temperature of between about 40° F. and about 120° F., such as about 40° F., about 50° F., about 60° F., about 70° F., about 80° F., about 90° F., about 100° F., about 110° F., or about 120° F. The separator 200 can treat fluid stream 100 for between about 5 minutes and about 30 minutes, such as about 5 minutes, about 10 minutes, about 15 minutes, about 20 minutes, about 25 minutes, about 30 minutes, or another amount of time.

Gas phase 210, which can include light hydrocarbons such as methane, ethane, propane, butane, or other light hydrocarbons, and gases such as carbon dioxide, nitrogen, or water vapor, exits the top of separator 200. Hydrocarbon phase 220, which can include heavier hydrocarbons, such as aromatics, resins, or other heavier hydrocarbons, exits the bottom of separator 200. Gas phase 210 and hydrocarbon phase 220 are processed as appropriate, for example, for consumption, sale, or disposal. Aqueous phase 230, which includes water and KHI, exits the bottom of separator 200. Because KHI polymers are generally water soluble, aqueous phase 230 contains most or all of the KHI originally present in fluid stream 100, which gas phase 210 and hydrocarbon phase 220 contain little or no KHI. In some examples, separator 200 can separate fluid stream 100 into two phases rather than three phases, for example, into a hydrocarbon phase and an aqueous phase.

Aqueous phase 230 is heated by a heat exchanger 300, such as a heater, in order to bring aqueous phase 230 to a target temperature for KHI removal. The target temperature for KHI removal can depend on factors such as the identity or characteristics of the KHI polymers, the identity or characteristics of the treatment chemical (described below)

used to extract KHI, or other factors, and can be determined on a case-by-case basis, for example, experimentally or based on knowledge of the KHI polymers or the treatment chemical or both. Without being bound by theory, it is believed that heating aqueous phase 230 can cause some or all of the dissolved KHI polymers to precipitate from solution, thus facilitating the downstream removal of KHI from aqueous phase 230.

In some examples, heat exchanger 300 heats aqueous phase 230 from a low temperature to higher temperature, such as to a temperature of between about 70° F. and about 160° F., for instance, to a temperature of about 70° F., about 80° F., about 90° F., about 100° F., about 110° F., about 120° F., about 130° F., about 140° F., about 150° F., or about 160° F. In some examples, heat exchanger 300 raises the temperature of aqueous phase 230 by at least about 5° F., for instance, at least about 10° F., at least about 20° F., at least about 30° F., at least about 40° F., at least about 50° F., at least about 60° F., at least about 70° F., at least about 80° F., at least about 90° F., or at least about 100° F. Heat exchanger 300 can be, for instance, a shell and tube heat exchanger or another type of heat exchanger.

The heated aqueous phase 230 flows from heat exchanger 300 into a mixer 400, such as a static mixer, a mechanical mixer, or another type of mixer. Mixer 400 can operate at a pressure of between about 700 psig and about 1500 psig, such as about 700 psig, about 800 psig, about 900 psig, about 1000 psig, about 1100 psig, about 1200 psi, about 1300 psi, about 1400 psig, or about 1500 psig. Mixer 400 can operate at the temperature of the incoming aqueous phase 230, for instance, at a temperature of about 70° F., about 80° F., about 90° F., about 100° F., about 110° F., about 120° F., about 130° F., about 140° F., about 150° F., or about 160° F. One or more treatment chemicals 130 are also introduced into mixer 400. The quantity of treatment chemicals 130 introduced into mixer 400 can depend on the amount of KHI in aqueous phase 230. For instance, treatment chemicals 130 can be introduced such that the ratio by weight of treatment chemicals 130 to KHI is between about 1 and about 5, such as about 1, about 1.5, about 2, about 2.5, or about 3.

A treatment chemical is a substance, such as an organic compound, that is substantially or completely immiscible with water and that has a high affinity for one or more types of KHI polymers in aqueous phase 230. Treatment chemicals are discussed in more detail below. When treatment chemicals 130 are mixed with aqueous phase 230, a two-phase liquid mixture 410 is formed, with the water in one phase and the treatment chemicals in the second phase. Because of the high affinity of treatment chemicals 130 for the KHI polymers, the KHI polymers are extracted entirely or in part from the water phase into the treatment chemical phase, and thus the second phase includes both treatment chemicals and KHI polymers. As a result, the water phase becomes largely or completely free of KHI polymers. For instance, an interaction between a functional group on the treatment chemical and a functional group on a KHI polymer can be sufficiently strong as to cause the KHI polymer to be extracted from aqueous phase 230 into the treatment chemical phase. Because treatment chemicals 130 are highly effective solvents for KHI polymers, only a small amount of treatment chemicals 130 can be used to cause significant displacement of KHI polymers from aqueous phase 230 into the treatment chemical phase.

Treatment chemical driven extraction of KHI from aqueous phase 230 can be achieved because of the relative solubility of KHI in each of the two immiscible liquids in the system, the water and the treatment chemicals. KHI is distributed between aqueous phase 230 and the treatment chemical phase according to its solubility in each phase. Because treatment chemicals 130 have such a high affinity for the KHI polymers, all or most of the KHI dissolves preferentially in the organic treatment chemical phase. Mixer 400 provides sufficient time to achieve proper mixing of the aqueous phase 230 with the treatment chemical phase, thus allowing sufficient contact between treatment chemicals and KHI and allowing KHI to be distributed into the two phases according to its solubility.

The elevated temperature of the aqueous phase 230 resulting from heating in heat exchanger 300 helps to encourage the removal of KHI from aqueous phase 230 through the use of the treatment chemical. The elevated temperature can also facilitate separation of water and treatment chemical with KHI in separator 500, discussed below. This solvent extraction of KHI from the water phase into the treatment chemical phase reduces the concentration of KHI in the aqueous phase. In some cases, when KHI precipitation begins in heat exchanger 300, the addition of treatment chemicals 130 to aqueous phase 230 enhances extraction of KHI from aqueous phase 230.

The role of separator 200 in removing hydrocarbons from aqueous phase 230 can help increase the effectiveness of treatment chemicals 130 in extracting KHI from the water phase. In particular, the affinity of KHI to treatment chemicals 130 is reduced with increasing amounts of liquid hydrocarbon present in a liquid mixture. Thus, by removing hydrocarbons prior to introducing treatment chemicals 130, any potential reduction in treatment chemical effectiveness due to hydrocarbons can be mitigated.

A two-phase mixture 410 exits mixer 400 and enters a three-phase separator 500. In three-phase separator 500, the aqueous phase and the treatment chemical phase are physically separated, a process sometimes referred to as liquid-liquid separation. For instance, the three-phase separator 500 can be a gravity separator that uses gravity settling to separate the denser aqueous phase from the less dense treatment chemical phase. Other types of physical separation, such as centrifugal separation, can also be used. Three-phase separator 500 can operate at a pressure of between about 700 psig and about 1500 psig, such as about 700 psig, about 800 psig, about 900 psig, about 1000 psig, about 1100 psig, about 1200 psi, about 1300 psi, about 1400 psig, or about 1500 psig. Three-phase separator 500 can operate at a temperature of between about 70° F. and about 160° F., such as about 70° F., about 80° F., about 90° F., about 100° F., about 110° F., about 120° F., about 130° F., about 140° F., about 150° F., or about 160° F. It is believed that the heating of aqueous phase 230 by heat exchanger 300 helps facilitate efficient separation of two-phase mixture 410 by three-phase separator 500.

Variable settling rates control the separation of two-phase mixture 410 in three-phase separator 500. Two-phase mixture 410 can be retained in three-phase separator 500 for a time sufficient to remove a target amount of KHI from the aqueous phase. For instance, two-phase mixture 410 can be retained for between about 6 hours and about 24 hours, such as about 6 hours, about 8 hours, about 10 hours, about 12 hours, about 16 hours, about 20 hours, about 24 hours, or another amount of time. In some examples, when two-phase mixture 410 is retained in three-phase separator 500 for a shorter amount of time, such as about 6 hours, a separation of about 70-100%, such as about 70%, about 80%, about 90%, or about 100%, can be achieved. In some examples, two-phase mixture 410 can be retained for a longer period of time, such as about 24 hours, to achieve a more complete separation of about 80-100%, such as about 80%, about 90%, or about 100%.

In some examples, organic acids can be added to mixer 400 in order to further facilitate KHI extraction into the treatment chemical phase. The acidity of aqueous phase 230 can be slightly increased, such as to a pH in the range of about 3 to about 7, by introducing a mild acid such as organic citric acid or formic acid. This slight increase in pH promotes the precipitation of KHI from aqueous phase 230, thus making KHI removal easier, particularly when a gravity settling approach to separation is employed by three-phase separator 500. The efficiency resulting from the addition of organic acids can allow the dimensions of three-phase separator 500 to be reduced, thus reducing costs for KHI separation processes. For instance, the retention time of two-phase mixture 410 in three-phase separator can be reduced by between about 2 hours and about 4 hours with the addition of organic acids.

In some examples, saline water can be added to mixer 400 in order to further facilitate KHI extraction into the treatment chemical phase. By adding saline water to increase the salinity of the aqueous phase 230, such as to a salinity of between about 5% and about 15% by mass, the rate of physical separation in three-phase separator 500 can be increased due to a greater difference in density between the less treatment chemical phase and the more dense saline water phase. For instance, substantially complete separation can be achieved within about 2-4 hours. The efficiency resulting from the addition of saline water can allow the dimensions of three-phase separator 500 to be reduced, thus reducing costs for KHI separation processes.

Three separate streams exit three-phase separator 500: a KHI stream 510 composed of the treatment chemicals and KHI polymers for which the treatment chemicals have an affinity, a water stream 520 composed of water with a reduced concentration of KHI, and vapor stream 530 containing light hydrocarbon components vaporized as a result of heating by heat exchanger 300. In some examples, water stream 520 contains at least about 40% by weight less KHI than aqueous phase 230, for example, at least about 50% less, at least about 60% less, at least about 70% less, at least about 80% less, at least about 90% less, or at least about 100% less KHI than aqueous phase 230. Vapor stream 530 can be returned to the process or routed elsewhere for disposal.

In some examples, water stream 520 is routed through a polisher 600, which removes any residual KHI from the water. The operating parameters of polisher 600 depend on the physical properties of the treatment chemical. For instance, whether polisher 600 is used and the operating parameters of polisher 600 can depend on the amount of KHI removed by separation in three-phase separator 500, the amount of time appropriate to remove a desired amount of KHI by separation in three-phase separator 500, the impact of residual KHI in water stream 520 on disposal or further processing, or other factors. A water stream 620, which is has a reduced concentration of KHI and treatment chemicals as compared to water stream 520, exits polisher 600 and flows to another system for use or further processing. In some examples, water stream 620 contains at least about 40% by weight less KHI than water stream 520, for example, at least about 50% less, at least about 60% less, at least about 70% less, at least about 80% less, at least about 90% less, or at least about 100% less KHI than water stream 520. For instance, water stream 620 can have a water quality that is suitable for re-injection into a disposal well or for further processing, such as in a hybrid KHI/MEG system.

A KHI stream 610, composed of residual KHI and treatment chemicals removed by polisher 600, joins KHI stream 510. Both KHI streams 510, 610 are pumped by a pump 700. In some cases, KHI streams 510, 610 are pumped to a disposal destination 710. In some cases, KHI streams 510, 610 are pumped to a treatment system, for example, for recovery and reuse of the KHI or the treatment chemicals or both. For instance, up to 100% of the treatment chemicals can be recovered in the disposal destination, such as between 80% and 100%, such as 80%, 80%, 90%, 95%, or 100% of the treatment chemicals.

Figure 2:
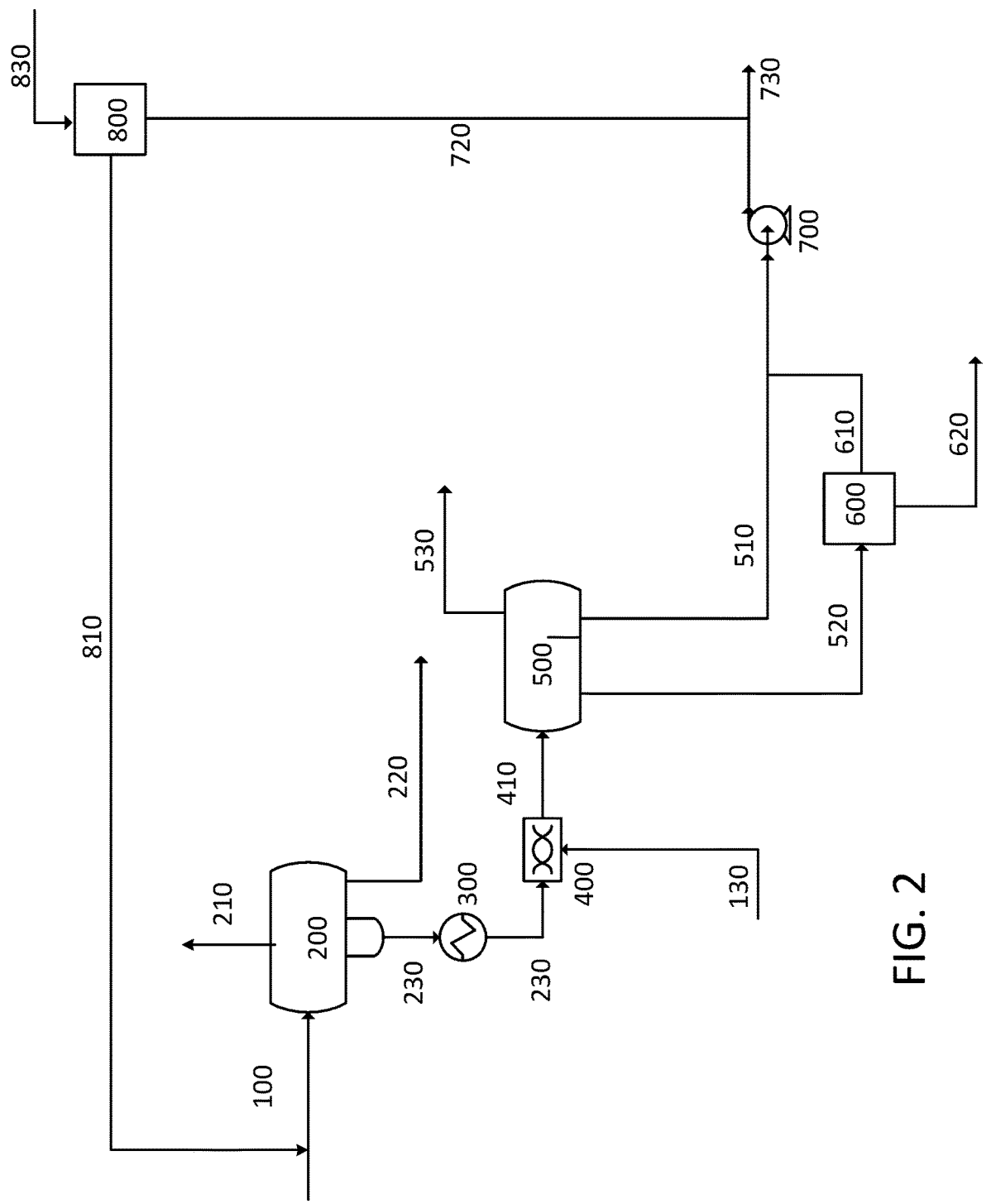

Referring to FIG. 2, in an example system 50, KHI is removed from fluid stream 100 as described above. KHI streams 510, 610, which contain KHI and treatment chemicals, are joined into a common stream 720 and pumped by pump 700 to a separation unit 800, which separates KHI from treatment chemicals. In some examples, a steam stream 730 is routed to a disposal destination. Without being bound by theory, it is believed that the injection of condensate 830 into separation unit 800 reduces the affinity of KHI to treatment chemicals, thus driving the dissolved KHI out of the phase including treatment chemicals. For instance, a ratio of condensate 830 to treatment chemical of at least one can reduce the affinity of KHI to treatment chemicals. The condensate can be, for instance, condensate from a hydrocarbon processing plant. Treatment chemicals are sent to another system for disposal or for reprocessing at downstream processing facilities. Recovered KHI 810 is returned to system 50 for reuse. For instance, recovered KHI 810 is introduced to fluid stream 100 in order to inhibit hydrate formation. In some examples, up to about 70% of the initially introduced KHI can be recovered, such as about 40%, about 50%, about 60%, or about 70%.

Figure 3:
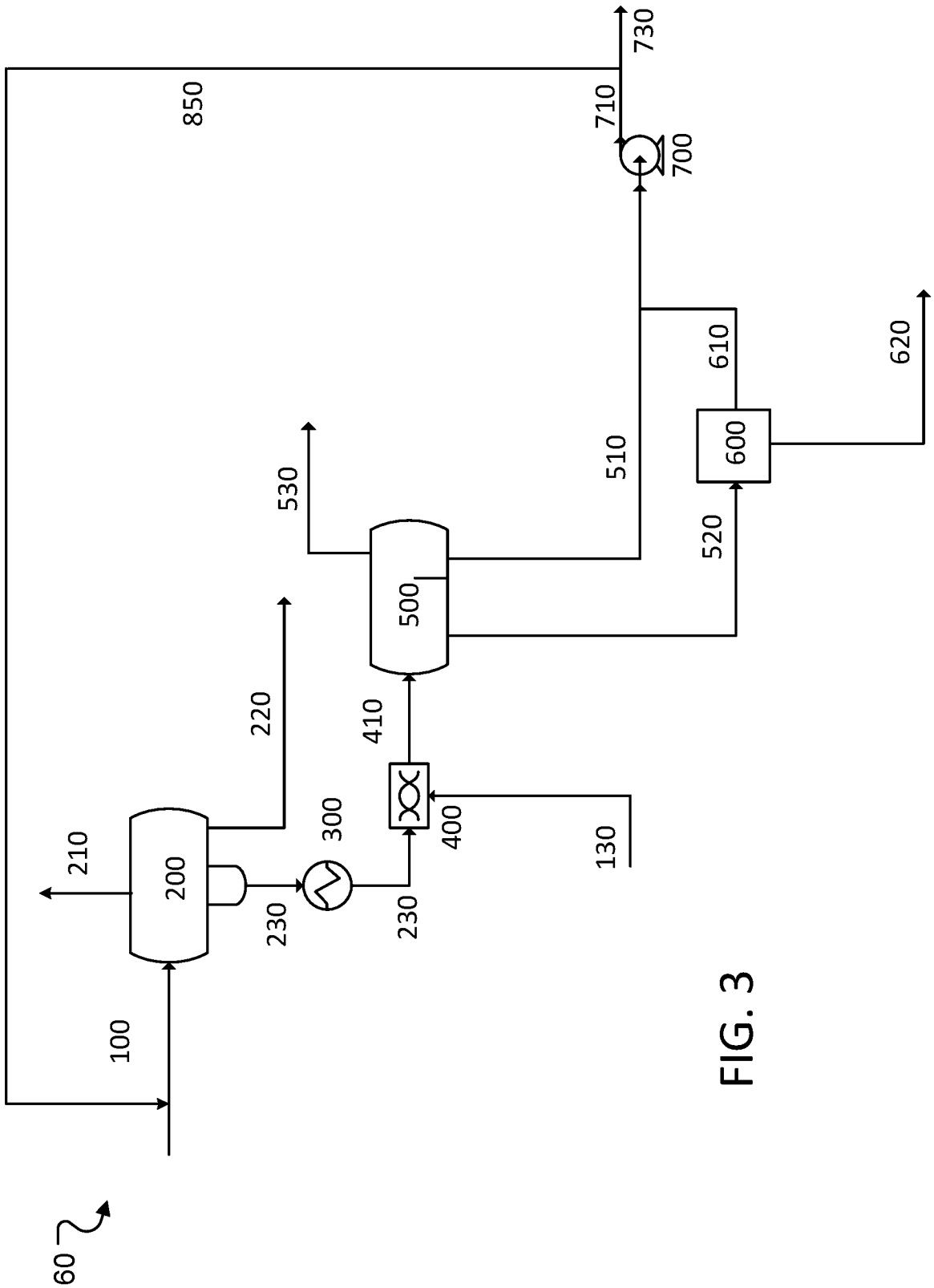

Referring to FIG. 3, in an example system 60, KHI is removed from fluid stream as described above. KHI streams 510, 610, which contain KHI and treatment chemicals, are joined into a recycle stream 850 and returned to system 50 for reuse. For instance, recycle stream 850, which contains both KHI and treatment chemicals, is introduced to fluid stream 100 in order to inhibit hydrate formation. Without being bound by theory, it is believed that the presence of hydrocarbons in fluid stream 100 causes a reduction in the affinity of KHI to treatment chemicals, and thus the presence of treatment chemicals in fluid stream 100 is not believed to affect the role of KHI in inhibiting hydrate formation. For instance, the affinity of KHI to treatment chemicals may become insignificant when the ratio of liquid hydrocarbons to treatment chemicals in fluid stream 100 exceeds a certain value, such as when the ratio is greater than one. In this case, the presence of treatment chemicals in fluid stream 100 is not believed to be able to extract KHI from aqueous solution, thus allowing the KHI to inhibit hydrate formation in fluid stream 100. Downstream, such as when hydrocarbons are removed in separator 200, the affinity of KHI to treatment chemicals is increased and the treatment chemicals are thus able to draw KHI out of aqueous solution.

In system 60, additional treatment chemicals 130 can be introduced into mixer 400, for instance, in order to increase the ratio of treatment chemicals to KHI. In some cases, the amount of treatment chemicals is sufficient and no additional treatment chemicals 130 are added into mixer 400.

KHI polymers can be organic, water miscible, or both. Example KHI polymers can include, for instance, one or more of the following polymers or combinations or derivatives thereof: poly(vinylcaprolactam) (PVCap); polyvinylpyrrolidone; poly(vinylvalerolactam); poly(vinylazacyclooctanone); co-polymers of vinylpyrrolidone and vinylcaprolactam; poly(N-methyl-N-vinylacetamide); copolymers of N-methyl-N-vinylacetamide and acryloyl piperidine; co-polymers of N-methyl-N-vinylacetamide and isopropyl methacrylamide; co-polymers of N-methyl-N-vinyl acetamide and methacryloyl pyrrolidine; copolymers of acryloyl pyrrolidine and N-methyl-N-vinylacetamide; acrylamide/maleimide co-polymers such as dimethylacrylamide (DMAM) copolymerized with, for example, maleimide (ME), ethyl maleimide (EME), propyl maleimide (PME), or butyl maleimide (BME); acrylamide/maleimide co-polymers such as DMAM/methyl maleimide (DMAM/MME) and DMAM/cyclohexyl maleimide (DMAM/CHME); N-vinyl amide/maleimide co-polymers such as N-methyl-Nvinylacetamide/ethyl maleimide (VIMAlEME); lactam maleimide co-polymers such as vinylcaprolactam ethylmaleimide (VCap/EME); polyvinyl alcohols; polyamines; polycaprolactams; or polymers or co-polymers of maleimides or acrylamides.

A KHI formulation can include one or more KHI polymers and one or more compounds that enhances the performance or solubility of the KHI polymers. The performance- or solubility-enhancing compounds can include, for instance, alcohols such as 2-butoxyethanol, (2-methoxymethylethoxy) propanol, or ethanediol.

A KHI formulation can include one or more types of polymers. In some examples, all of the types of polymers in a given KHI formulation can be removed by a single treatment chemical. In some examples, fewer than all of the types of polymers in a KHI formulation can be removed by a single treatment chemical. For instance, a single treatment chemical may remove at least 50% of one of the types of polymers in a KHI formulation, such as at least about 60%, at least about 70%, at least about 80%, at least about 90%, at least about 95%, or about 100% of one of the types of polymers, while removing little to none of the other type(s) of polymers in the KHI formulation.

To remove multiple types of polymers in a KHI formulation, such as all of the types of polymers, an aqueous phase containing KHI can be treated by multiple treatment chemicals, either simultaneously or in series. For instance, treatment by multiple treatment chemicals may remove at least 50% by weight of some or all of the types of polymers in a KHI formulation, such as at least about 60%, at least about 70%, at least about 80%, at least about 90%, at least about 95%, or about 100% of some or all of the types of polymers. In some cases, not all of the types of polymers in a KHI formulation are removed from the aqueous phase. For instance, polymers that do not tend to precipitate into sludge may not be removed.

A treatment chemical is a substance, such as an organic compound, that is substantially or completely immiscible with water and that has a high affinity for one or more types of KHI polymers. For instance, a treatment chemical can have a miscibility with water of less than about 10% by mass, such as about 0.1%, about 0.5%, about 1%, about 1.5%, about 2%, about 3%, about 4%, about 5%, about 6%, about 7%, about 8%, about 9%, or about 10% miscibility with water. A treatment chemical can be a non-polar substance that includes a functional group with an affinity for a functional group of one or more of the types of KHI polymers. For instance, a treatment chemical can include a hydrophobic portion, such as a hydrocarbon chain; and a hydrophilic portion, such as a portion containing a hydroxyl (—OH) group. In some examples, a treatment chemical can be a fatty alcohol based substance.

Treatment chemicals can include alcohols with sufficiently large carbon number to be immiscible with water, such as alcohols with at least three carbon atoms or alcohols with between three carbon atoms and twelve carbon atoms, for instance, alcohols with three carbon atoms, four carbon atoms, five carbon atoms, six carbon atoms, seven carbon atoms, eight carbon atoms, nine carbon atoms, ten carbon atoms, eleven carbon atoms, or twelve carbon atoms. The alcohol can include an alkyl group, an allyl group, a cyclic group, or a benzyl group. For instance, the alcohol can be butanol, pentanol, hexanol, or octanol.

Treatment chemicals can include glycol ethers with sufficiently large carbon number to be immiscible with water, such as glycol ethers with at least six carbon atoms. The glycol ether can include a hydrocarbon group such as an alkyl group, an allyl group, a cyclic group, a benzyl group, or a phenol group. For instance, the glycol ether can be ethylene glycol monoethyl ether, ethylene glycol monopropyl ether, ethylene glycol monobutyl ether, ethylene glycol monophenyl ether, ethylene glycol monobenzyl ether, diethylene glycol monomethyl ether, diethylene glycol monoethyl ether, or diethylene glycol mono-n-butyl ether.

In some examples, treatment chemicals can include a first organic compound, such as an alcohol or a glycol ether; and one or more second organic compounds of lower density than the first organic compound. The second organic compound can be a hydrocarbon, such as a hydrocarbon having a carbon number less than or equal to the carbon number of the first organic compound. The lower density second organic compound or compounds can assist in the separation of the mixture of treatment chemicals 130 and aqueous phase 230 into two phases. For instance, the second organic compound can include butane, pentane, hexane, or octane.

Figure 4:
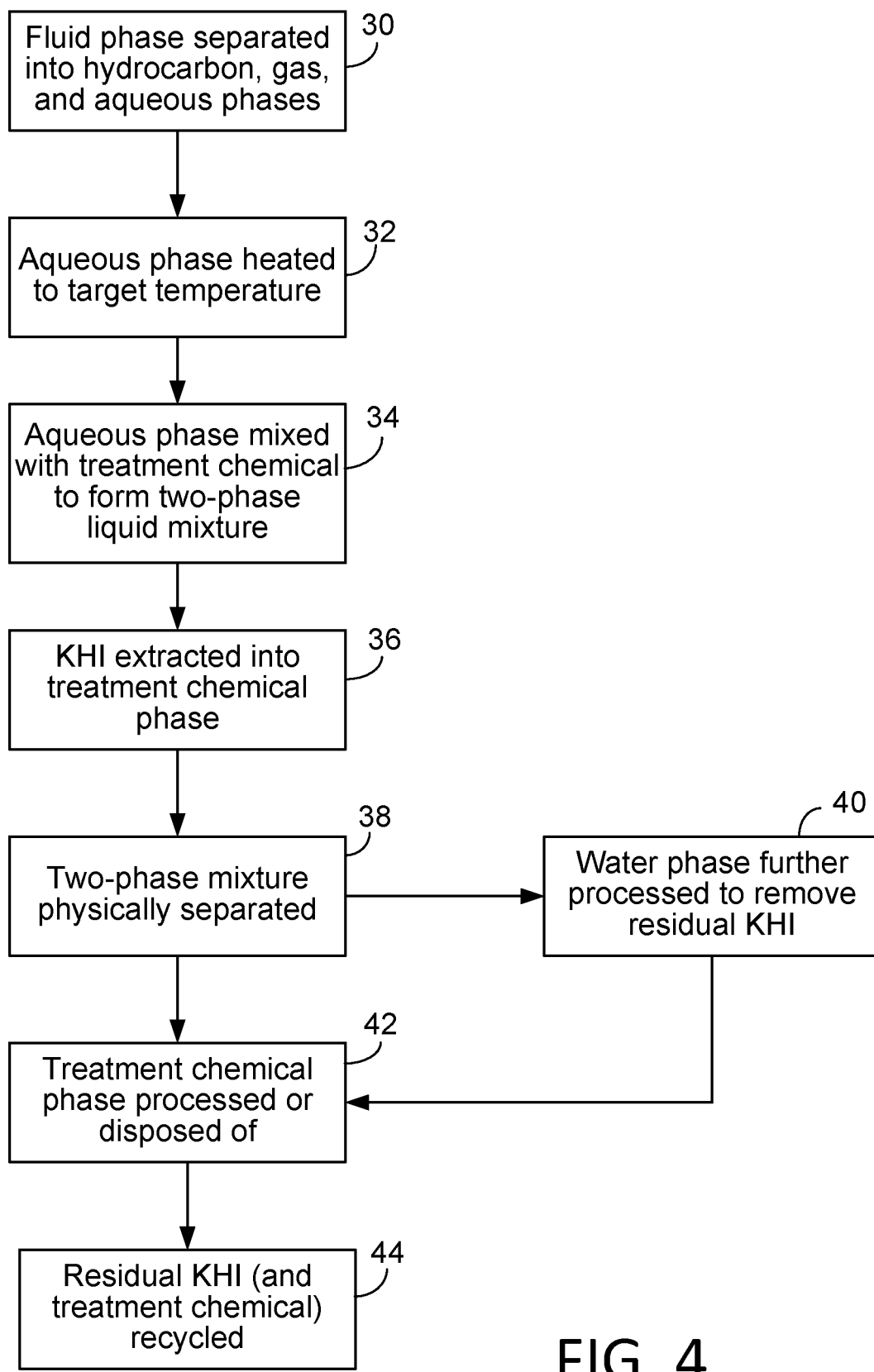
FIG. 4 is a flow chart.

Referring to FIG. 4, in a general process for KHI removal, a fluid stream that has been treated with KHI, for example, in order to inhibit hydrate formation, is separated into a gas phase, a hydrocarbon phase, and an aqueous phase (30). Most or all of the KHI originally present in the fluid stream is contained in the aqueous phase, while the gas and hydrocarbon phases generally contain little or no KHI. The aqueous phase containing KHI is heated to a target temperature for KHI removal (32), for example, in a heat exchanger. For instance, the target temperature can be based on the identity or characteristics of the KHI polymers, the identity or characteristics of the treatment chemical used to extract KHI, or other factors. Heating of the aqueous phase can cause some or all of the dissolved KHI polymers to precipitate from solution, thus facilitating downstream removal of KHI from the aqueous phase and liquid/liquid phase separation.

The heated aqueous phase flows to a mixer, where the aqueous phase is mixed with one or more treatment chemicals to form a two-phase liquid mixture (34). The treatment chemicals are immiscible with water and exhibit a high affinity for one or more types of KHI polymers in the aqueous phase. During the mixing process, KHI polymers are thus extracted from the aqueous phase into the treatment chemical phase (36), reducing the concentration of KHI in the aqueous phase. The elevated temperature of the aqueous phase helps to encourage the removal of KHI from the aqueous phase and liquid/liquid phase separation.

The two-phase liquid mixture flows into a separator where the mixture is physically separated (38), for example, by gravity settling, in order to separate the more dense water phase from the less dense treatment phase including KHI. The treatment chemical phase is disposed of or processed for KHI recovery and reuse (42). In some examples, the water phase is further processed, for example, in a polisher, to remove residual KHI (40). For instance, the water phase can be further processed in the polisher if a target level of KHI removal cannot be achieved in the separator in a desired amount of time. The water exiting the polisher, which has a reduced level of KHI, is sent to other systems for use or further processing. Residual KHI removed from the water phase in the polisher is disposed of or processed for KHI recovery and reuse (42). For instance, KHI can be recovered and reused to treat a fluid stream to inhibit hydrate formation.

Example—Treatment Chemical Screening and Assessment

Four treatment chemicals (TCs) were screened for effectiveness in removing two types of KHI from aqueous solution. Based on the screening results, two TCs were selected for further assessment, including assessment of the effects of temperature, salinity, solvents, and re-treatment on the KHI removal effectiveness of each TC.

In the screening phase, four TCs that are known to effectively remove KHI from water were screened to determine their removal effectiveness for two specific KHI systems. The TCs screened in this example are referred to as TC7, TC7A, TCBA, and TC8, which are commercially available products, such as those described in PCT publication WO 2013/121217, the contents of which are incorporated here by reference in their entirety.

The first KHI system (referred to as System 1) contained 2.5% by mass of a first KHI formulation in an aqueous solution. The first KHI formulation was Baker EK1398 HIW KHI, with a composition of 30-60% diethylene glycol monoethyl ether, 10-30% 2-butoxyethanol, and 10-30% alkyl substituted polyamide copolymer.

The second KHI system (referred to as System 2) contained 5.0% by mass of a second, different KHI formulation in an aqueous solution. The second KHI formulation was Nalco-Champion EC981A KHI, with a composition of 10-30% ethylene glycol monoethyl ether, 10-30% (2-methoxymethylethoxy) propanol, and 10-30% ethanediol.

In the screening analysis, samples from System 1 and System 2 were each treated with one of the TCs listed above. For each sample, water containing the corresponding KHI formulation at a concentration of between about 2.5% and about 5% by weight was stirred in a beaker with a magnetic stirrer at room temperature. A TC was injected into the KHI-containing water and the time until a clear light liquid phase appeared was measured. The ratio of injected TC to KHI in the samples was between about 1 and about 3 by weight.

Following TC treatment, the mass percent of KHI removed from aqueous solution was determined by UV-visible spectroscopy. UV-vis spectroscopy is generally sensitive to KHI polymers yet largely unaffected by common KHI solvents, such as monoethylene glycol (MEG) or ethylene glycol butyl ether (EGBE) in which KHI polymers are sometimes dissolved. UV-vis spectroscopy can thus be a useful and accurate tool for KHI removal analysis.

A UV-vis absorbance spectrum of a sample prior to treatment (sometimes referred to as the calibration spectrum) was compared with a UV-vis absorbance spectrum of the same sample following TC treatment. The difference between the calibration spectrum and the post-treatment spectrum was used to determine the percentage of KHI remaining in aqueous solution following TC treatment and accordingly the percentage of KHI removed from aqueous solution as a result of TC treatment. Because analysis of UV-vis absorbance spectra is based on a comparison between the calibration spectrum and the post-treatment spectrum, the specific polymer fraction of a particular KHI is not necessary in order to determine the percentage of KHI removed from solution by a TC treatment.

In some cases, gravimetric analysis was conducted to confirm the KHI removal results determined by UV-vis spectroscopy. Treated samples were dried and the remaining solids weight to determine the weight of KHI remaining following TC treatment. As a control, an untreated sample from each of System 1 and System 2 was also dried and weighed to establish a baseline solids content against which the post-treatment samples were compared.

The post-treatment cloud point temperature and fouling temperature (if any) were also determined for each sample. The cloud point temperature of a sample is the temperature at which waxes in the sample begin to solidify, giving the sample a cloudy appearance. The fouling temperature of a sample is the temperature above the cloud point temperature at which coagulated polymer is first observed. Fouling propensity, cloud point, and fouling point tests were conducted using an atmospheric pressure heated glass visual cell method with a laser intensity automated cloud point apparatus. The laser intensity automated cloud point apparatus measures changes in sample transparency as a function of temperature during heating or cooling, from which the cloud point temperature can be determined. Visual observation was used to determine the temperature at which fouling of each sample by solids or semi-solids occurred. In visual observation tests, samples were observed at 10° C. intervals above the cloud point temperature to identify the onset of solid or semi-solid build-up.

Results of the screening analysis of TC7, TC7A, TCBA, and TC8 for System 1 samples are shown in Table 1. KHI removal from System 1 samples was generally in the range of 32-39% for TC7, TCBA, and TC8. TC7A removed up to 93% of KHI, as confirmed by two separate analyses.

TABLE 1

TC screening for System 1.

| System | KHI dose (mass %) | Aq. polymer (mass %) | TC | Polymer removed (mass %) | PTCPT (° C.) | PTFT (° C.) |
| --- | --- | --- | --- | --- | --- | --- |
| System 1 KHI only | 2.5 | 0.74 | TC7 | 39 | 50 | N/A |
| | 2.5 | 0.74 | TC7A | 84-93 | >90 | >90 |
| | 2.5 | 0.74 | TCBA | 37 | 60 | N/A |
| | 2.5 | 0.74 | TC8 | 32 | 50 | N/A |

The identity of the KHI polymers in the System 1 samples is unknown. The results shown in Table 1 indicate that the KHI in System 1 may be composed of two different polymers, one of which is relatively easy to remove and the other of which is more difficult to remove. Only TC7A succeeded in removing both types of KHI polymers from the System 1 samples. The System 1 samples treated with TC7A also showed neither clouding nor fouling at temperatures up to 90° C., which is a further indication that high levels of KHI were removed by TC7A treatment.

Results of the screening analysis of TC7, TC7A, TCBA, and TC8 for System 2 samples are shown in Table 2. TC7A and TCBA each removed about 63-64% of KHI. The lowest level of KHI removal was 44%, by TC8.

TABLE 2

Treatment chemical screening and assessment for System 2.

| System | KHI dose (mass %) | Aq. polymer (mass %) | TC | Polymer removed (mass %) | PTCPT (° C.) | PTFT (° C.) |
|---|---|---|---|---|---|---|
| System 2 KHI only | 5.0 | 0.86 | TC7 | 55 | 41 | >90 |
| | 5.0 | 0.86 | TC7A | 63 | 43 | >90 |
| | 5.0 | 0.86 | TCBA | 64 | 39 | >90 |
| | 5.0 | 0.86 | TC8 | 44 | 43 | >90 |
| System 2 KHI only 50° C. | 5.0 | 0.86 | TC7 | 50 | 46 | >90 |
| | 5.0 | 0.86 | TC7A | 64 | 43 | >90 |
| System 2 1250 ppm corrosion inhibitor | 5.0 | 0.86 | TC7 | 50 | 41 | >90 |
| | 5.0 | 0.86 | TC7A | 57 | 43 | >90 |
| System 2 10% NaCl | 5.0 | 0.86 | TC7 | 46 | 28 | >50 |
| | 5.0 | 0.86 | TC7A | 60 | 29 | >50 |
| System 2 20% MEG | 5.0 | 0.86 | TC7 | 56 | 30 | >90 |
| | 5.0 | 0.86 | TC7A | 53 | 35 | >90 |
| System 2 2x treated | 5.0 | 0.86 | TC7 | 64 | N/A | N/A |
| | 5.0 | 0.86 | TC7A | 64 | N/A | N/A |

The KHI from System 2 is known to be composed of at least two types of polymers. The results shown in Table 2 indicate that each TC may have been generally more successful at removing one or more of the KHI polymers than the other(s). The post-treatment fouling temperature tests further support this hypothesis. In all treated System 2 samples, no fouling was observed below 90° C., and cloud points were observed at 39-43° C. The observed cloud points are believed to be due to remnant glycol ether, a solvent in some KHI formulations, which is immiscible with water at higher temperatures.

Based on the results of these screening tests, TC7 was selected for further assessment. TC7 was the most effective TC for both System 1 and System 2 in terms of KHI removal capability and elimination of post-treatment fouling at high temperature. TC7, which is chemically similar to TC7A but with a different functional group, was selected as a backup for further assessment. TCBA, which showed generally good performance, is a solid and thus may need more complex formulation in order to be more readily useful.

Further tests were conducted on System 2 samples to assess the effect of temperature, corrosion inhibitors, salinity, solvents, and re-treatment on the KHI removal effectiveness of TC7 and TC7A. Results of these tests are shown in Table 2 (above).

To assess the effect of high temperature on KHI removal, System 2 samples were treated with TC7 or TC7A at 50° C. As can be seen from Table 4, the higher treatment temperature did not have a significant effect on KHI removal. No fouling was observed up to 90° C. These results are consistent with the theory that the KHI in System 2 is composed of multiple polymers, at least one of which has a high drop-out temperature and is thus difficult to remove from aqueous solution. Because this polymer is difficult to remove from aqueous solution, even at high temperature, a high fouling temperature was observed, indicating that potential fouling issues posed by this polymer during water handling or re-injection are relatively low.

To assess the effect of the presence of a corrosion inhibitor on KHI removal, System 2 samples were treated with TC7 or TC7A in the presence of a commercially available corrosion inhibitor. As can be seen from Table 2, the presence of the corrosion inhibitor slightly reduced the KHI removal effectiveness of both TCs. For instance, the mass percent of KHI removed by TC7A fell from 64% (without corrosion inhibitor) to 57%. No fouling was observed up to 90° C.

To assess the effect of the presence of saline on KHI removal, System 2 samples were treated with TC7 or TC7A in the presence of 10% by weight sodium chloride (NaCl). As can be seen from Table 2, the presence of saline slightly reduced the KHI removal effectiveness of both TCs. For instance, the mass percent of KHI removed by TC7A fell from 64% (without NaCl) to 60%. Cloud point temperatures were reduced to about 28-29° C. In addition, these samples exhibited a small degree of solids deposition when heated following TC treatment. A fine suspension of solid particles began to appear around 50° C. As the samples were heated further, the fine solid particles coagulated into a small, semi-solid material that floated on the water, which had almost completely clarified.

To assess the effect of the presence of monoethylene glycol (MEG), a common KHI solvent, on KHI removal, System 2 samples were treated with TC7 or TC7A in the presence of 20% by weight MEG. As can be seen from Table 2, the presence of MEG slightly reduced the effectiveness of both TCs. For instance, the mass percent of KHI removed by TC7A fell from 64% (without MEG) to 53%. Cloud point temperatures were reduced to about 30-35° C. No fouling was observed up to 90° C., suggesting that any KHI polymers that may present potential fouling problems were largely removed.

To examine whether additional KHI can be removed by multiple TC treatments, System 2 samples were treated twice with the same TC (either TC7 or TC7A). Specifically, each sample was treated as described above, following which the treated aqueous phase was separated and treated again. As can be seen from Table 2, the mass percent of KHI removed by both TC7 and TC7A was 64%, indicating that re-treatment can improve KHI removal. These results also indicate that a maximum removal threshold may exist for a given combination of KHI and TC. These results are consistent with the theory that the System 2 KHI is composed of multiple polymers, one or more of which are largely removed by re-treatment and the other(s) of which remain in aqueous solution.

Other implementations are also within the scope of the following claims.

What is claimed is:

1. A method comprising:
   receiving a water stream from a hydrocarbon production facility, the water stream having a first concentration of a kinetic hydrate inhibitor (KHI);
   flowing the water stream through a heat exchanger to heat the water stream to a target temperature between about 70° F. and about 160° F.;
   mixing the heated water stream with a treatment chemical to form a two-phase mixture, the treatment chemical having an affinity for the KHI;
   flowing the two-phase mixture into a separator; and
   physically separating the two-phase mixture into a first phase and a second phase, the first phase including water and having a second concentration of the KHI less than the first concentration, and the second phase including the KHI and the treatment chemical, the density of the second phase being less than the density of the first phase.

2. The method of claim 1, wherein receiving the water stream comprises:
   receiving a fluid stream from the hydrocarbon production facility; and separating the fluid stream into a hydrocarbon stream and the water stream.

3. The method of claim 2, further comprising separating the fluid stream into the hydrocarbon stream, the water stream, and a gas stream.

4. The method of claim 1, wherein the received water stream is at a first temperature, and wherein the target temperature is at least 5° F. greater than the first temperature.

5. The method of claim 1, wherein flowing the water stream through a heat exchanger comprises heating the water stream to a temperature sufficient to cause at least some of the KHI to precipitate from the water stream.

6. The method of claim 1, wherein mixing the heated water stream with a treatment chemical comprises adding the treatment chemical to the water stream such that a ratio of the treatment chemical to the KHI is between 1 and 3.

7. The method of claim 1, wherein physically separating the two-phase mixture comprises performing a gravity separation.

8. The method of claim 1, wherein physically separating the two-phase mixture comprises retaining the two-phase mixture in the separator for between 6 hours and 24 hours.

9. The method of claim 1, further comprising processing the first phase to remove residual KHI.

10. The method of claim 9, wherein processing the first phase comprises generating a third phase having a third concentration of KHI, the third concentration being less than the second concentration.

11. The method of claim 1, further comprising removing the KHI from the second phase.

12. The method of claim 11, comprising:
adding a condensate to the second phase; and
removing the KHI from the second phase including the condensate.

13. The method of claim 11, further comprising returning the second phase or KHI separated from the second phase to an upstream destination in the hydrocarbon processing or production facility for reuse.

14. The method of claim 1, wherein the treatment chemical is substantially immiscible with water.

15. The method of claim 1, wherein the treatment chemical comprises a functional group that has an affinity for a component of the KHI.

16. The method of claim 1, wherein the second concentration is at least about 40% less than the first concentration.

17. The method of claim 1, wherein a cloud point temperature of the first phase is at least 40° C.

18. The method of claim 1, wherein a fouling temperature of the first phase is at least 90° C.

19. The method of claim 1, wherein mixing the heated water stream with a treatment chemical comprises mixing the heated water stream, the treatment chemical, and an organic acid.

20. The method of claim 1, wherein mixing the heated water stream with a treatment chemical comprises mixing the heated water stream, the treatment chemical, and a saline solution.

* * * * *